C. YOUNGER.
CORN HUSKER.
APPLICATION FILED JULY 22, 1912.

1,086,115.

Patented Feb. 3, 1914.

3 SHEETS—SHEET 1.

WITNESSES:

INVENTOR.
Charles Younger
BY
ATTORNEY.

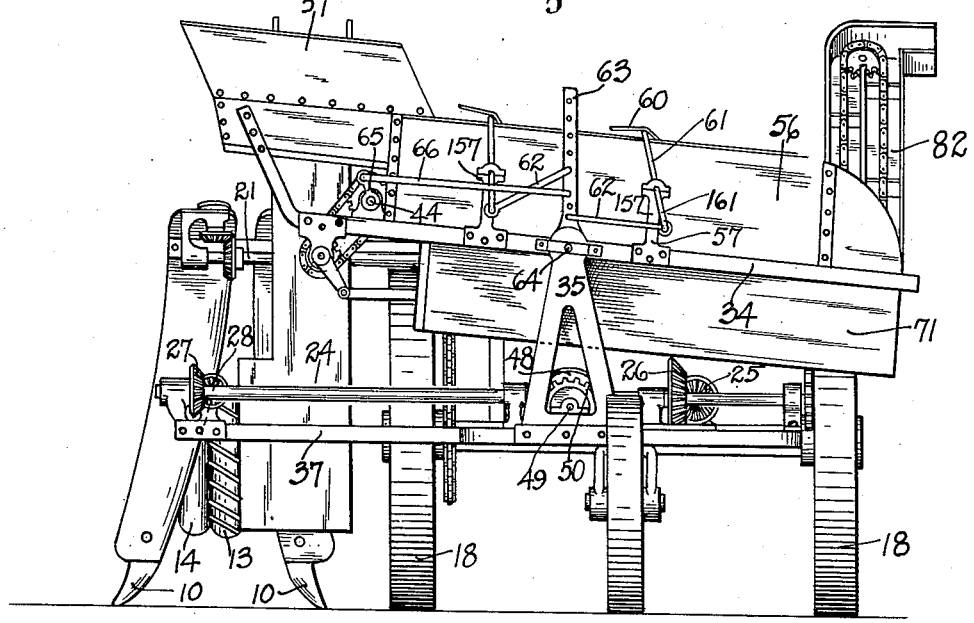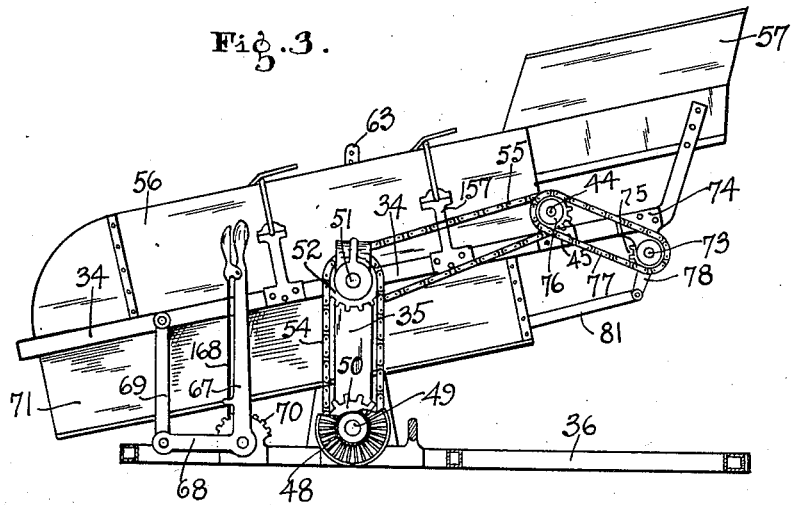

C. YOUNGER.
CORN HUSKER.
APPLICATION FILED JULY 22, 1912.
1,086,115.
Patented Feb. 3, 1914.
3 SHEETS—SHEET 3.
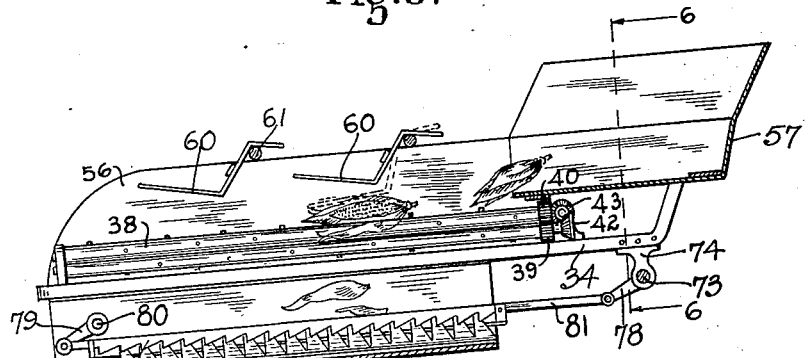
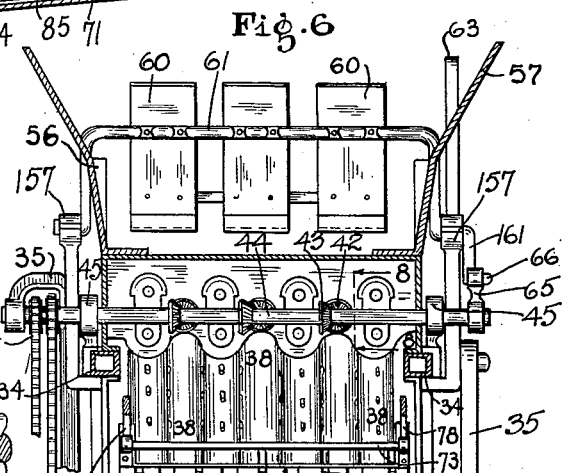
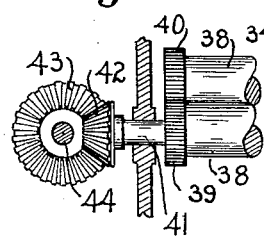
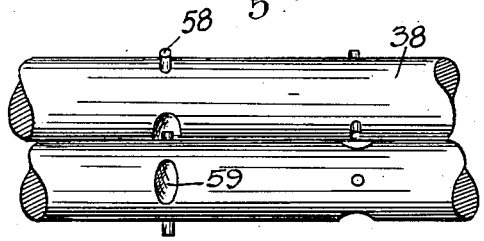
WITNESSES:
A. H. Edgerton
O. M. McLaughlin
INVENTOR.
Charles Younger.
BY
R. H. Lockwood
ATTORNEY.

UNITED STATES PATENT OFFICE.

CHARLES YOUNGER, OF RUSHVILLE, INDIANA, ASSIGNOR OF ONE-HALF TO ALPHEUS P. WALKER, OF RUSHVILLE, INDIANA, AND ONE-HALF TO CHARLES B. SMITH, OF ST. LOUIS, MISSOURI, AND MARSHALL E. NEWHOUSE, OF RUSHVILLE, INDIANA.

CORN-HUSKER.

1,086,115. Specification of Letters Patent. Patented Feb. 3, 1914.

Application filed July 22, 1912. Serial No. 710,870.

*To all whom it may concern:*

Be it known that I, CHARLES YOUNGER, a citizen of the United States, and a resident of Rushville, county of Rush, and State of Indiana, have invented a certain useful Corn-Husker; and I do hereby declare that the following is a full, clear, and exact description thereof, reference being had to the accompanying drawings.

The object of this invention is to provide a corn gathering and husking machine with improved means for handling and removing both the corn and the husks.

One feature of the invention lies in the use of flexible depressing "hands" oscillatable so as to move vertically by which the ears of corn may be intermittently engaged and pressed down against the husking rolls by which the removal of all of the husks is assured, even the innermost layers which cling very closely to the corn.

A second feature lies in the use of a perforated and oscillatable plate located beneath the husking rolls and through which parts of a husk conveyer project and operate for separating any shelled corn from the husks as they are removed and for removing the husks.

Another feature lies in mounting the husking rolls upon a pivotally mounted frame operated by a hand lever by means of which their inclination may be varied for controlling the duration of the husking process and do so to suit variations of the surface of the ground and while the machine is moving along.

Figure 1:
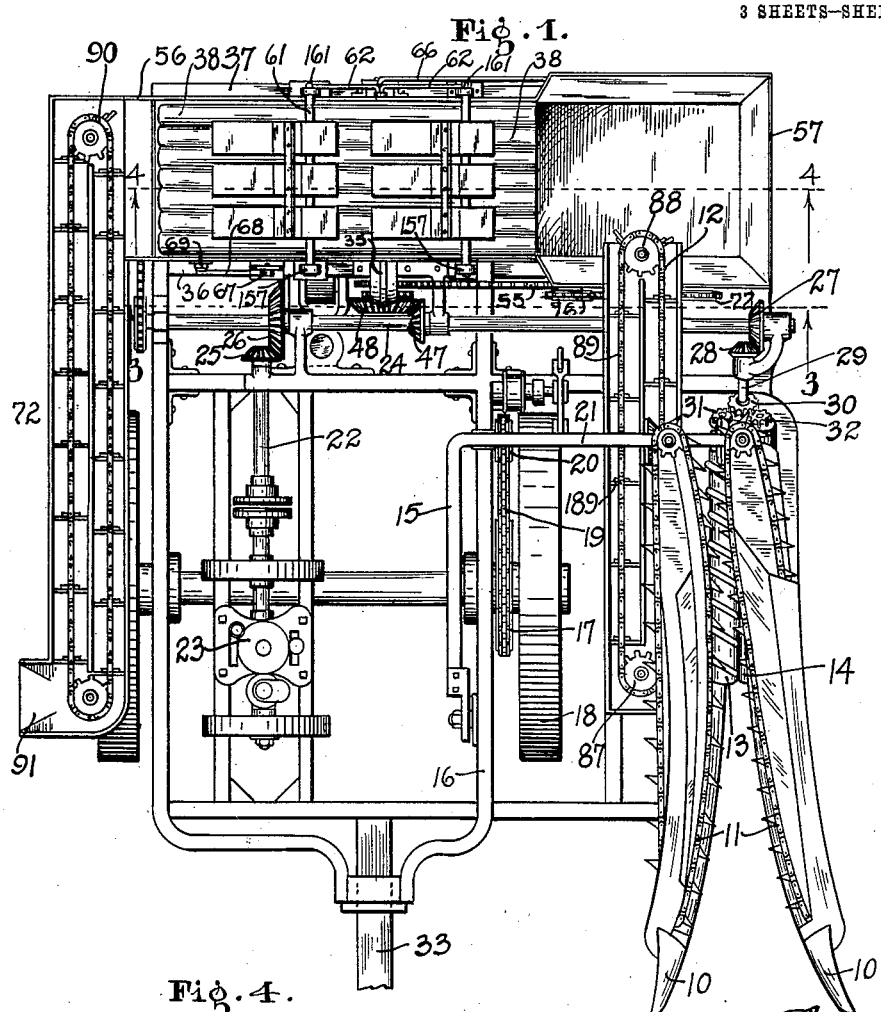
Figure 4:
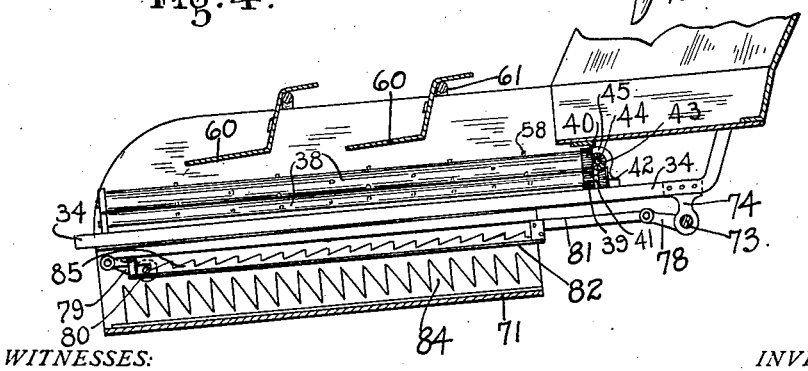

The nature of the invention will be understood from the accompanying drawings and the following description and claims:

In the drawings, Figure 1 is a plan view of my improved corn gatherer and husker. Fig. 2 is a rear elevation of the same. Fig. 3 is a vertical transverse section on the line 3—3 of Fig. 1. Fig. 4 is a vertical transverse section on the line 4—4 of Fig. 1. Fig. 5 is the same as Fig. 4, but shows the action of the depressing hand as the ears of corn are moved through the machine and showing the husk conveyer in an operated position. Fig. 6 is a vertical longitudinal section on the line 6—6 of Fig. 5. Fig. 7 is a plan view of a portion of the husking rolls. Fig. 8 is an elevation of the ends of two of the husking rolls, showing the means for driving them.

There is shown herein a corn harvester which is adapted to be drawn through the field in such a manner that a pair of diverging and downwardly inclined gatherers 10 will straddle a row of corn and by the aid of chains 11 carrying the usual pusher links, the stalks will pass between inclined snapping rolls 13 and 14 which will remove the ears of corn from the stalks and allow them to fall into a conveyer 12 which will convey them to the husking rolls 38, the stalks in the meantime being passed and dropped from the rear of the machine. The gatherers 10 are mounted on a frame 15 oscillatably mounted upon a main frame 16 and the gatherer chains 11 are driven from a sprocket wheel 17 secured to one of the driving wheels 18, through a chain 19, a sprocket 20 and shaft 21, see dotted lines in Fig. 1, all in the well known manner. The snapping rolls 13 and 14 may be given any desired positive drive. As here shown a shaft 22 of an engine 23 drives a shaft 24 through beveled gears 25 and 26, and a beveled gear 27 upon said shaft meshes with a beveled gear 28 upon a short shaft 29 which also carries a gear 30 in mesh with gears 31 and 32 upon the snapping rolls 13 and 14, respectively. The machine may be drawn through the field by means of a tongue 33.

A transverse frame 34 is pivotally mounted on frames 35 extending upwardly from the transverse bars 36 and 37 near the rear of the main frame and the husking rolls 38 are mounted upon this frame and lie transversely of the machine. Every other one of the husking rolls is set slightly above the adjoining rolls and the upper ones are driven from the lower ones through gears 39 and 40, see Fig. 8. A shaft 41 for the lower rolls carries a bevel gear 42 meshing with bevel gears 43 upon a shaft 44. Said shaft 44 is mounted in brackets 45 secured to the frame 34 and a sprocket wheel 46 is secured to the outer left-hand end of said shaft, as shown in Fig. 6. A bevel gear 47 upon the shaft 24 meshes with a bevel gear 48 upon a shaft 49 at the foot of the front bracket 35, see Figs. 1 and 3. A sprocket wheel 50, partially shown in Fig. 3, is also mounted upon the shaft 49. The upper end of the front bracket 35 is overhung and carries a shaft 51 upon which two sprockets, not shown, are mounted and said shaft is driven by means of a chain 54 which passes over one of said sprockets and the sprocket 50. A chain 55 surrounds the other of said sprocket wheels and the sprocket 46 serves to drive the shaft 44 and thus drive the husking rolls 38. Inclined sides 56 are secured to the frame 34 and lie parallel with the husking rolls and upon the right hand end, as shown in Fig. 3, a receiving box 57 is secured, the bottom of which projects a short distance over the husking rolls and the unhusked corn delivered to said receiving box by the conveyer 12, will move down by gravity onto the husking rolls guided by the inclined sides 56.

The husking rolls themselves are of well known construction and are formed as shown in Fig. 7, with alternating rows of pins 58 and elongated holes 59, the pins upon one roll being adapted to mesh with the holes upon the adjoining roll and as the corn travels down the husking rolls, due to their inclination, the pins 58 seizing the husks, will draw them down between the rolls and strip them off the ears of corn. When the corn is wet or if the husks cling very closely to the corn, the ears might pass over the husking rolls without being fully husked and for this purpose two rows of depressing hands 60 are provided for pressing the corn against the husking rolls and insuring the complete removal of all of the husks. There are three of these depressing hands 60 in each row which are secured to U-shaped bars 61 extending over the sides 56 and having bearings in brackets 157 mounted upon the frame bars 34. Upon the rear side of the machine each of these U-shaped bars extends below its bracket 157 and its lower end 161 is pivoted to one end of a link 62 whose other end pivotally engages a rocker arm 63 pivotally mounted coaxial with the rear pivot 64 of the frame 34. There is a crank 65 upon the rear end of the shaft 44 which is connected to said rocker arm 63 by means of a link 66. Thus as the husking rolls are driven, the rocker arm 63 will be oscillated and the depressing hands 60 will be alternately raised and lowered for allowing the corn first to pass beneath them and then pressing it against the husking rolls. Preferably the depressing hands are of flexible material so as to yield slightly to take care of corn of different diameters.

For the purpose of regulating the time of the travel of the ears along the husking rolls 38, a lever 67 is fulcrumed upon the frame bar 36 near the left-hand side of the machine, as seen in Fig. 1. Said lever carries an extension 68, to the outer end of which one end of a link is secured whose upper end is pivotally secured to one of the bars of the frame 34. A toothed arc 70 is secured near the lower end of the lever 67 and the well known locking rod 168 is provided in connection with the lever 67 for engaging the toothed rack 70 and holding the lever in any desired position. By throwing the lever to the left of the position shown in Fig. 3, the husking rolls would be given a greater inclination, while throwing it to the right of the position shown in Fig. 3, will move them toward a horizontal position. If the husks do not cling closely to the ears of corn, the husking rolls may be given a sharp inclination so that the corn may pass quickly over the rolls, but in case the husks are wet or cling closely to the corn, the frame is thrown by means of the lever 67 so that the time of travel over the husking rolls will be materially greater.

An open ended chute 71 is secured to the frame 34 beneath the husking rolls 38 with the bottom lying parallel with the husking rolls for engaging any corn shelled by the action of the pins 58 upon the husking rolls and delivering it to the conveyer 72 along with the unshelled husked corn. A shaft 73 is supported by brackets 74 secured to the frame bars 34 near the right-hand end, as seen in Figs. 3, 4 and 5, and upon the forward end of said shaft a sprocket wheel 75 is secured. A sprocket 76 is secured upon the forward end of the shaft 44 and in alinement with the sprocket 75 and a chain 77 surrounds said sprocket for driving the shaft 73. A crank 78 is secured to the shaft 72 adjacent each of the brackets 74 and similar cranks 79 are oppositely pivoted upon pins 80 in the vertical sides of the chute 71 and near the left-hand end, as seen in Fig. 5. Each pair of the cranks 78 and 79 are connected by a rod or bar 81 which lies adjacent the sides of the chute 71 and a plate 82 with perforations or holes 182 is secured to said bars and extends across the chute between the husking rolls 38 and the bottom of the chute. There is a series of longitudinal slots in said plate and beneath each slot a toothed bar 84 is secured to the bottom plate of the chute 71 in such a manner that as the shaft 73 is revolved and the plate 82 is moved to its lowest position, the upwardly extending teeth of said bars 84 will project through the slots 83 and extend above the upper surface of the plate 82 for the purpose hereafter described. A second series of toothed bars 85 is secured upon the upper side of the plate 82, but with the teeth projecting downwardly toward said plate and beneath each of these toothed bars there is a longitudinal slot 86 in the plate 82. The toothed bars 85 are staggered with relation to the toothed bars 84 and are for the purpose of forcing the husks down upon the teeth of the bars 84 as the plate 82 moves downward and toward the left, as shown in Fig. 4, for arresting the movement of the husks.

The conveyer 12 for moving the corn from the receptacle into which it falls after being removed from the stalks up to the receiving bin 57 may be of any desired construction. As here shown there are sprocket wheels 87 and 88 over which a chain 89 passes upon which there are pusher links 189 which engage the corn and elevate it to the receiving bin 57. There is a similar conveyer 90 for elevating the husked and shelled corn after it leaves the husking rolls and delivering it to a spout 91 considerably above the level of the husking rolls and projecting beyond the side of the machine and so adapted that a wagon may be driven along the side of the machine and receive the corn as the process of husking is completed.

The operation of my invention is as follows: The ears of corn upon being snapped from the stalks by the action of the well known snapping rolls 13 and 14, will be carried by the conveyer 12 to the receiving bin 57 from which they will move by gravity down upon the husking rolls 38 and being alternately pressed toward said rolls and released under the action of the depressing hand 60, the pins 58 upon the husking rolls, engaging the husks as said pins move into cavities 59 upon the mating roll, will strip the husks from the corn after which the ears of corn will move downward and be caught by the conveyer 90 and elevated and delivered from the spout 91 to a wagon drawn alongside the machine, as heretofore described. If any corn is shelled by the action of the pins 58, it will fall upon the plate 82 and either pass through the holes 182 in said plate or through the elongated slots 83 or 86 and thence to the bottom of the bin 71 and from there pass to the left and be elevated by the conveyer 90 along with the unshelled corn. The husks, however, will fall upon the plate 82 and as said plate moves downward and toward the left, the teeth on the bar 84 will extend above the surface of said plate and the left-hand movement of the husks. With the continued rotation of the shaft 73 in the direction of the arrow shown in Figs. 4 and 5, said plate will move upward and toward the right and the husks will be elevated away from the teeth of the bars 84 and carried toward the right, a distance practically equal to the throw of the cranks 78 and 79. With another downward movement of the plate 82, the husks will be again elevated and thus the husks will gradually be moved toward the right and discharged from the upper right-hand end of the plate 82, as seen in Fig. 5. Thus, none of the shelled corn will be carried away and wasted along with the husks.

I claim as my invention:

1. A corn husking machine including a main frame, a husking roll frame, means mounted on the main frame for pivotally supporting the husking roll frame about midway its length so that it may be tilted, husking rolls mounted on said husking roll frame, means for tilting said husking roll frame, driven means mounted concentrically with the pivotal mounting of said husking roll frame, and means for transmitting power therefrom to the ends of the husking rolls for driving them.

2. A corn husking machine including husking rolls, shafts extending above and transversely thereof and having cranked ends, spring plates secured on said shafts with portions projecting over and longitudinally of the husking rolls, means for fulcruming the cranked ends of said shafts between the ends of the crank portions, a rock bar provided with a number of holes in it, means for rocking said bar, and a connecting rod pivoted to the cranked end of each shaft and adjustably connected with said rocking bar whereby said spring plates may be actuated and the extent of movement thereof controlled.

In witness whereof, I have hereunto affixed my signature in the presence of the witnesses herein named.

CHARLES YOUNGER.

Witnesses:
FRANK S. KEELY,
CHARLES ALEXANDER.

Copies of this patent may be obtained for five cents each, by addressing the "Commissioner of Patents, Washington, D. C."